United States Patent [19]

Mahle et al.

[11] 4,277,214

[45] Jul. 7, 1981

[54] BARGE LOADING DEVICE

[75] Inventors: Howard C. Mahle, Minnetonka; Kenneth L. Wesenberg, Roseville, both of Minn.

[73] Assignee: Nott Company, Minneapolis, Minn.

[21] Appl. No.: 102,404

[22] Filed: Dec. 11, 1979

[51] Int. Cl.³ .................................. B65G 67/60
[52] U.S. Cl. ................................ 414/139; 414/299; 193/16; 193/30; 212/246
[58] Field of Search ............. 414/139, 140, 144, 293, 414/299–301; 193/16, 23, 30; 212/246

[56] References Cited

U.S. PATENT DOCUMENTS

| | | | |
|---|---|---|---|
| 283,037 | 8/1883 | Stock | 212/246 |
| 726,685 | 4/1903 | Holbrook | 414/139 |
| 2,651,423 | 9/1953 | Rose et al. | 414/139 |
| 3,198,353 | 8/1965 | McDowell | 414/139 |
| 3,690,731 | 9/1972 | Mylting | 414/139 X |

FOREIGN PATENT DOCUMENTS 968982 12/1950 France ..................... 414/144
714071 8/1954 United Kingdom ............ 414/139

*Primary Examiner*—Robert W. Saifer
*Attorney, Agent, or Firm*—Zarley, McKee, Thomte, Voorhees & Sease

[57] ABSTRACT

A barge loading device comprising a vertically disposed support tower positioned between a pair of barges or the like. A boom is rotatably mounted on the support tower and extends outwardly therefrom. A vertically disposed telescopic spout extends downwardly from the outer end of the boom. A conveyor is provided on the support tower and the boom for supplying grain or the like to the upper end of the spout for delivery to one of the barges. The boom may be rotatably moved relative to the support tower to facilitate the loading of the barges on either side of the tower. The spout may be tilted to either side of its normally disposed vertical position and may be rotated about its longitudinal axis. The combination of the rotatable boom, tilting and rotating spout permits greater areas to be filled in the barges.

12 Claims, 5 Drawing Figures

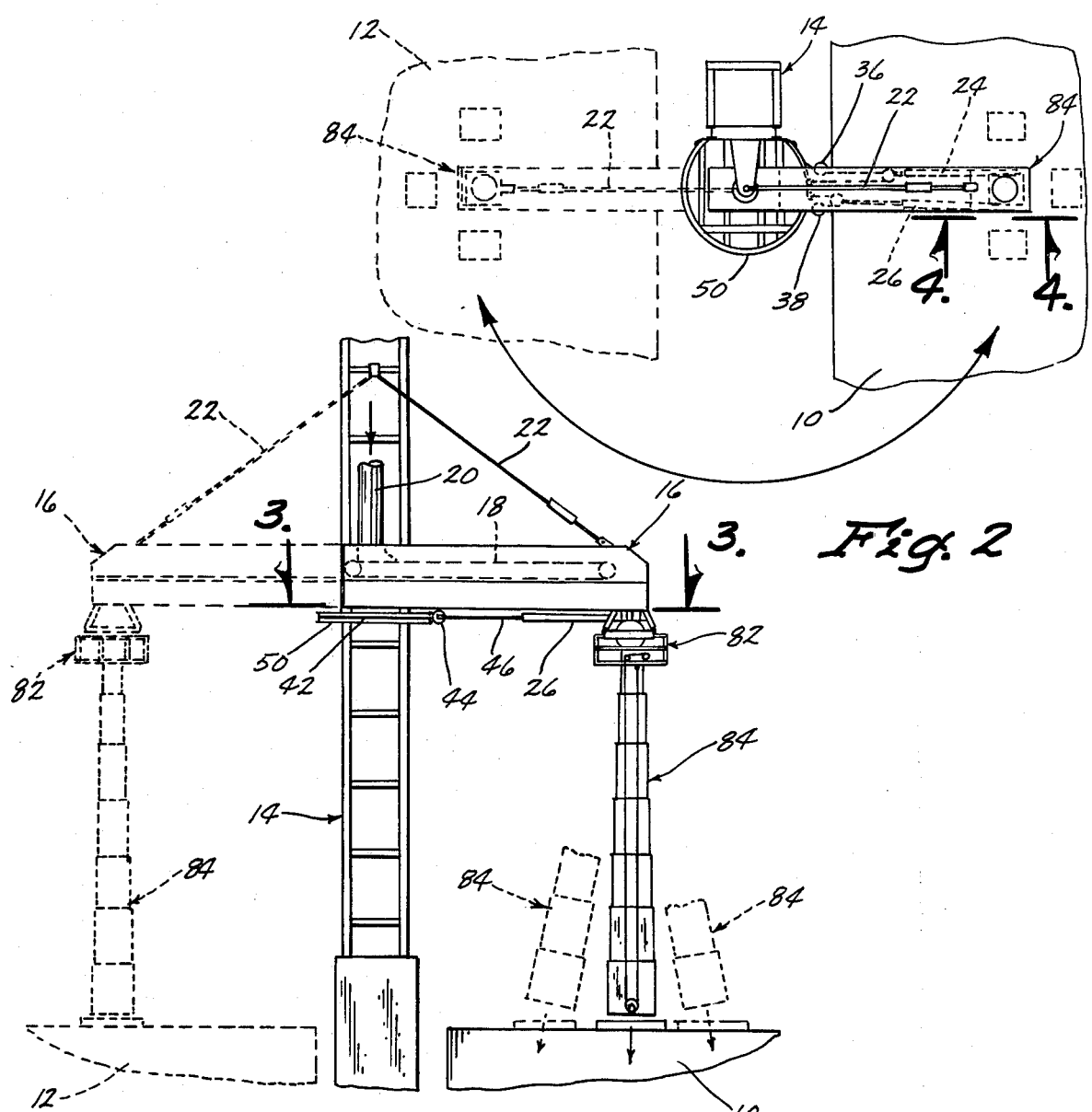
Fig. 2
Fig. 1
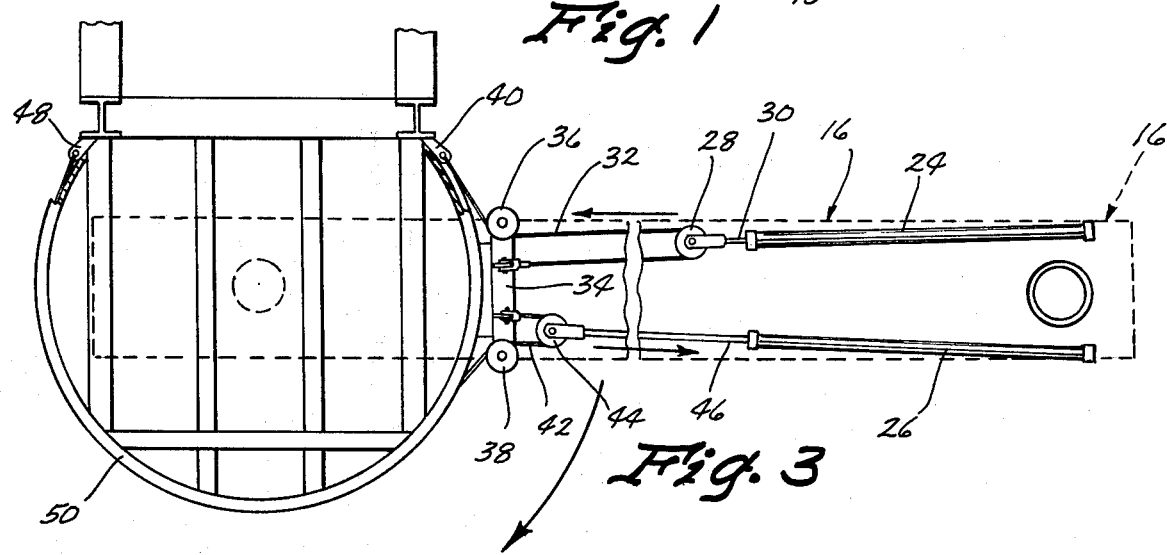
Fig. 3

BARGE LOADING DEVICE

BACKGROUND OF THE INVENTION

Grain or the like is commonly delivered to river barges for transport to a remote location. The barges normally have open hatches or the like into which the grain is delivered. Conventional grain loading devices normally comprise a spout extending downwardly and outwardly from an elevator leg. The spouts are not as maneuverable as desired which results in the necessity of the barge being successively moved during the loading operation so that all of the hatches may be filled.

Therefore, it is a principal object of the invention to provide an improved barge loading device.

A still further object of the invention is to provide a barge loading device which permits greater areas of the barges to be loaded than with conventional barge loading devices.

A still further object of the invention is to provide a barge loading device including a telescoping vertical spout which may be moved between barges and which may be rotated and tilted to facilitate the loading of the barges.

A still further object of the invention is to provide a barge loading device which permits the corners of the barge hatches or bins to be conveniently loaded.

A still further object of the invention is to provide a barge loading device which is economical of manufacture and durable in use.

These and other objects will be apparent to those skilled in the art.

BRIEF DESCRIPTION OF THE DRAWINGS

FIG. 1 is a side view of the barge loading device of this invention with the broken lines illustrating the alternate positions to which the apparatus may be moved;

FIG. 2 is a top elevational view of the barge loading device of this invention which also illustrates the alternate positions to which the spout may be moved;

FIG. 3 is an enlarged sectional view seen on lines 3—3 of FIG. 1;

SUMMARY OF THE INVENTION

Figures 4, 5:
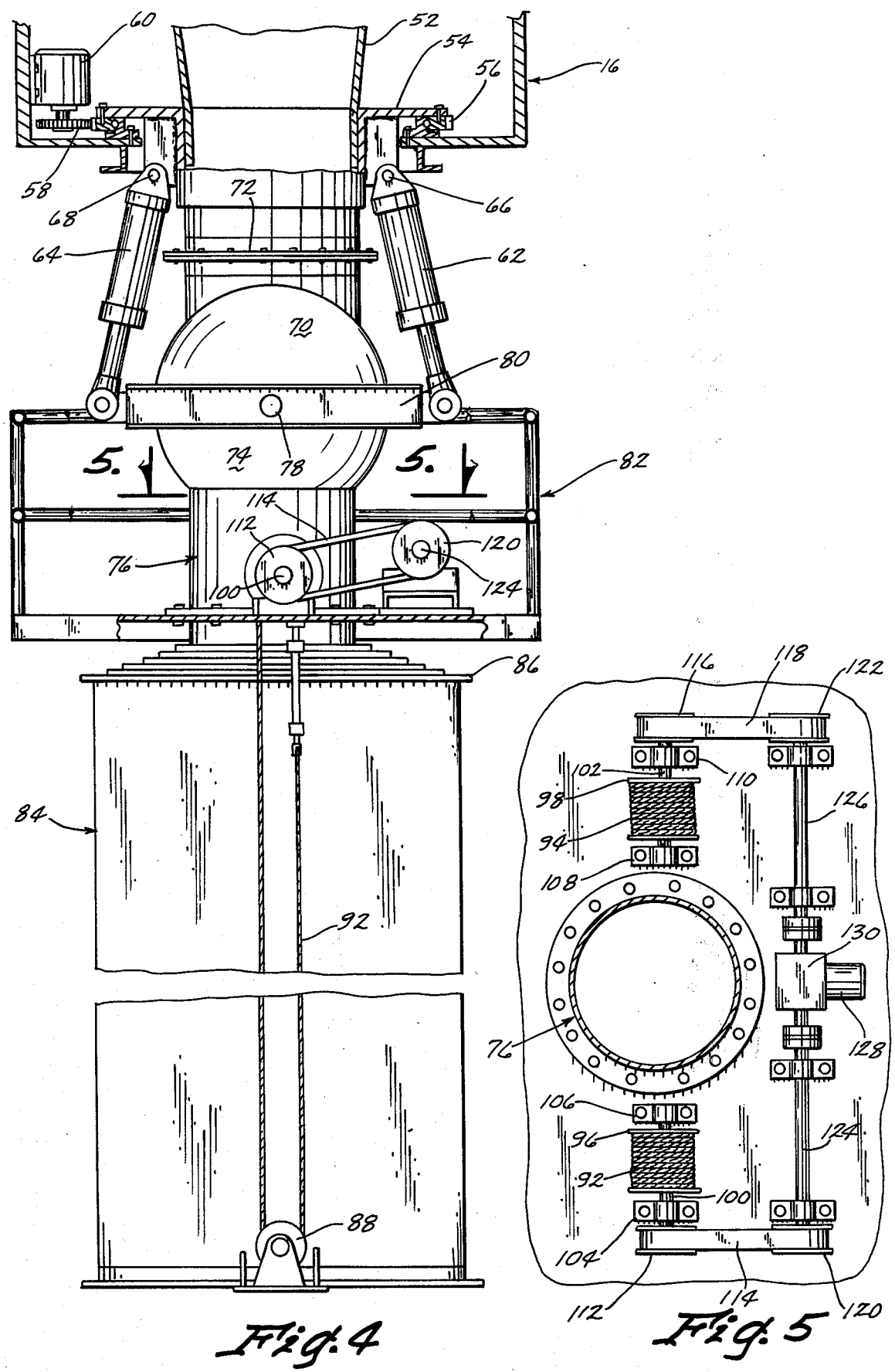
FIG. 4 is an enlarged sectional view seen on lines 4—4 of FIG. 2.
FIG. 5 is an enlarged sectional view seen on lines 5—5 of FIG. 4.

A barge loading device is described comprising a vertically disposed support tower which extends upwardly between a pair of river barges. A horizontally disposed boom means is rotatably mounted on the support tower and may be swung approximately 180° so that its outer end may be selectively positioned over either of the barges. A vertically telescopic spout is secured to the outer end of the boom means and extends downwardly therefrom towards the loading area. The spout may be tilted from side to side and may be rotated about its longitudinal axis so that corners of the barge may be loaded as well as the centers thereof.

DESCRIPTION OF THE PREFERRED EMBODIMENT

In the drawings, the numerals 10 and 12 refer to barges positioned on either side of a vertically disposed support tower 14. The numeral 16 refers to a boom means secured to and positioned at one side of the tower 14 which may be rotated approximately 180° from the position illustrated by solid lines in FIG. 2 to the position illustrated by broken lines in FIG. 2 so that the outer end of the boom means may be positioned above either of the barges 10 or 12. Enclosed within the boom means 16 is a horizontally extending conveyor 18, the inner end of which is in communication with leg 20 so that grain supplied to the leg 20 will be delivered by the conveyor 18 to the outer end of the boom means 16. The boom means 16 is enclosed and is constructed of suitable girders or beams. Cable 22 extends downwardly from the tower 14 to the outer end of the boom means 16 for support.

The boom means 16 may be rotated from the position illustrated by solid lines in FIG. 2 to the position illustrated by broken lines in FIG. 2 by means of the apparatus best illustrated in FIG. 3. A pair of hydraulic cylinders 24 and 26 are positioned below the boom means and are connected thereto as illustrated. Cylinder sheave 28 is mounted on the cylinder rod 30 of cylinder 24 and has cable 32 extending therearound. As seen in FIG. 3, one end of cable 32 is secured to frame 34 having the sheaves 36 and 38 mounted thereon. As illustrated in FIG. 3, cable 32 extends around sheave 36 and is connected to the shoe 40 which is anchored to tower 14. Cable 42 has one end thereof secured to the frame 34 and extends around the cylinder sheave 44 mounted on rod 46 of cylinder 26. The other end of cable 42 is secured to shoe 48 which is anchored to tower 14. A curved channel 50 is provided for receiving the cables 32 and 42 as seen in FIG. 3. As stated, shoes 40 and 48 are connected to the tower 14 below the boom means while the outer end of the cylinder 24 and 26 are operatively connected to the outer end of the boom means. Thus, extension of cylinder 24 and simultaneous retraction of cylinder 26 causes the boom means 16 to rotatably move in a clockwise direction as viewed in FIG. 3 and as illustrated by the arrow in FIG. 3. Conversely, extension of cylinder 26 and the retraction of cylinder 24 causes the boom means 16 to rotate in a counterclockwise direction as viewed in FIG. 3.

The outer end of conveyor 18 is in communication with a vertically disposed spout portion 52 which is mounted in the outer end of the boom means 16 as best illustrated in FIG. 4. Spout portion 52 is in communication with the discharge end of conveyor 18. Turn head assembly 54 extends outwardly from the spout portion 52 and has a gear rack 56 mounted thereon. Pinion 58 is in mesh with the gear rack 56 and is rotatably operated by means of an electric motor 60.

A pair of hydraulic cylinders 62 and 64 have their upper ends pivotally connected to the turn head assembly 54 at 66 and 68 respectively in the manner seen in FIG. 4. The numeral 70 refers to an upper knuckle portion secured to the upper turn head assembly 54 by bolts 72. Lower knuckle 74 embraces the lower end of upper knuckle portion 70 and forms the upper portion of a lower turn head assembly 76. The upper and lower knuckles 70 and 74 are pivotally connected at 78. Support 80 is connected to lower knuckle portion 74 and to pivotal connection 78. The lower rod ends of cylinders 62 and 64 are pivotally connected to support 80 as illustrated. Frame means 82 is operatively connected to the support 80 and supports the lower turn head assembly 76 as seen in FIG. 4. Thus, the retraction of cylinder 64 and the extension of cylinder 62 causes the lower turn head assembly 76 to pivot to the left as seen in FIG. 4 while retraction of cylinder 62 and the extension of cylinder 64 will cause the lower turn head assembly 76 to pivot or tilt to the right as viewed in FIG. 4.

The numeral 84 refers to a telescopic spout comprised of a plurality of spout sections 86 which nest within each other (FIG. 4) and which are square in cross-section. A pair of sheaves 88 and 90 (not shown) are mounted on the lower end of the outermost spout section 86 opposite to one another and have cables 92 and 94 extending therearound respectively. As seen in the drawings, one end of cable 92 is rigidly affixed to the frame means 82. It should be understood that one end of the cable 94 is affixed to the frame means 82 in a similar manner to that just described. Cables 92 and 94 are wound upon drums 96 and 98 positioned on shafts 100 and 102 respectively. Shaft 100 is rotatably mounted in bearings 104 and 106 mounted on the frame means 82 while shaft 102 is mounted in bearings 108 and 110 also mounted on frame means 82. The outer end of shaft 100 has a pulley 112 mounted thereon which has belt 114 extending therearound. Shaft 102 has pulley 116 mounted thereon which receives the belt 118. Belts 114 and 118 extend around pulleys 120 and 122 respectively which are mounted on shafts 124 and 126 respectively which are rotatably mounted in suitable bearings positioned on the frame means 82. Motor 128 is mounted on gear box 130 which drives the shafts 124 and 126. Thus, operation of the motor 128 in one direction will cause the cables 92 and 94 to unwind from the drums 96 and 98 respectively which causes the downward extension of the spout. Conversely, the operation of the motor 128 in an opposite direction causes the cables 92 and 94 to be wound upon the drums 96 and 98 respectively so that the spout is retracted.

In operation, the spout means 84 would normally be in the retracted position illustrated in FIG. 4 with the boom means 16 ordinarily being positioned midway between the barges 10 and 12. After the barges 10 and 12 have been positioned on either side of the tower 14, the hydraulic cylinders 24 and 26 are operated so that the boom means 16 is swung into position so that the outer end thereof is positioned over the barge 10. The motor 128 is then actuated to cause the spout means 84 to lower to the position illustrated in FIG. 1. Grain is then supplied to the conveyor 18 through the leg 20 with the grain being supplied to the upper end of the spout means 86. When the center portion of the barge has been filled, the cylinders 62 and 64 are actuated so that the spout means 84 may be tilted to either of the positions illustrated by broken lines in FIG. 1 so that the sides of the barge may also be loaded. The entire spout assembly may also be rotated about its longitudinal axis by means of the motor 60. Actuation of the motor 60 causes the pinion 58 to rotate which causes the upper turn head assembly 54 to rotate about its vertical axis. The combination of the tilting of the spout means 84 to either of the positions illustrated by broken lines in FIG. 1 together with the rotational movement of the spout enables the corners of the barge to be easily loaded.

Thus it can be seen that a unique barge loading device has been described which permits larger portions of the barge to be loaded than with conventional equipment. The fact that the boom means may be swung as well as the spout being able to be rotated and tilted does provide a much more convenient method of loading the barges than with conventional apparatus.

Thus it can be seen that the device of this invention accomplishes at least all of its stated objectives.

We claim:

1. A barge loading device comprising,
   a support tower,
   a boom means rotatably mounted on said support tower, about a vertical axis, and extending outwardly therefrom,
   a vertically disposed spout extending downwardly from the outer end of said boom means,
   conveyor means on said support tower and said boom means for conveying material to the upper end of said spout,
   first means for rotatably moving said boom means relative to said support tower,
   second means for tilting said spout to either side of its normally disposed vertical position,
   and third means for rotating said spout about its longitudinal axis.

2. The device of claim 1 wherein said spout is comprised of a plurality of telescopic spout sections.

3. The device of claim 2 wherein a fourth means is connected to said spout sections for vertically moving said spout sections from a retracted to an extended position.

4. The device of claim 1 wherein said first means comprises a hydraulic cylinder means mounted on said boom means.

5. The device of claim 1 wherein said second means comprises a hydraulic cylinder means extending between said boom means and said spout.

6. The device of claim 1 wherein said third means comprises a rack and pinion means.

7. The device of claim 1 wherein said boom means comprises a horizontally extending frame means including inner and outer ends, the inner end of said frame means being operatively rotatably secured, about the said vertical axis, to said support tower, first and second hydraulic cylinders having one end thereof operatively secured to said frame means adjacent the outer end thereof, each of said cylinders having a sheave rotatably mounted on the end of its cylinder rod, first and second spaced-apart sheaves rotatably mounted on said frame means adjacent the inner end thereof, a first cable having one end operatively anchored to said support tower and extending around said first sheave, thence around the sheave on said first cylinder, and thence to a point of connection to said frame means, a second cable having one end operatively anchored to said support tower and extending around said second sheave, thence around the sheave on said second cylinder, thence to a point of connection to said frame means, the extension of said first cylinder and the simultaneous retraction of said second cylinder causing said boom means to rotate in one direction about its said vertical axis of rotation, the retraction of said first cylinder and the simultaneous extension of said second cylinder causing said boom means to rotate in a direction opposite to said one direction.

8. A barge loading device comprising,
   an upstanding support means,
   a horizontally extending boom means rotatably mounted on said suppot means, about a vertical axis, and extending outwardly therefrom,
   a conveyor means on said support means and boom means for conveying material to the outer end of said boom means,
   an upper turn head assembly rotatably mounted, about a vertical axis, at the outer end of said boom means, said upper turn head assembly including an upper spout portion which is in communication with said conveyor means, means for rotating said upper turn head assembly relative to said boom means, a lower turn head assembly pivotally mounted, about a horizontal axis, on said upper turn head assembly, means extending between said upper and lower turn head assembly for pivoting said lower turn head assembly relative to said upper turn head assembly, a telescopic spout means extending downwardly from said lower turn head assembly, the upper end of said spout means being in operative communication with said upper spout portion, and means for telescoping said spout means.

9. The device of claim 8 wherein said means for rotating said upper turn head assembly comprises a gear rack secured to said upper turn head assembly, a reversible motor mounted on said boom means and having a pinion thereon which is in mesh with said gear rack.

10. The device of claim 8 wherein said means extending between said upper and lower turn head assemblies comprises a hydraulic cylinder means.

11. The device of claim 8 wherein said spout means comprises a plurality of telescopic spout sections and wherein a cable means is operatively connected to the lowermost spout section for raising and lowering said spout means.

12. The device of claim 11 wherein a powered cable drum means is mounted on said lower turn head assembly having said cable means wound thereon whereby operation of the powered cable drum means will extend and retract said spout means.

* * * * *